United States Patent
Ahles et al.

(10) Patent No.: US 8,485,041 B2
(45) Date of Patent: Jul. 16, 2013

(54) SENSOR SYSTEM, METHOD FOR OPERATING A SENSOR SYSTEM, AND METHOD FOR MANUFACTURING A SENSOR SYSTEM

(75) Inventors: Marcus Ahles, Pfullingen (DE); Hubert Benzel, Pliezhausen (DE); Heribert Weber, Nuertingen (DE)

(73) Assignee: Robert Bosch GmbH, Stuttgart (DE)

( * ) Notice: Subject to any disclaimer, the term of this patent is extended or adjusted under 35 U.S.C. 154(b) by 115 days.

(21) Appl. No.: 12/737,966

(22) PCT Filed: Jul. 10, 2009

(86) PCT No.: PCT/EP2009/058802
§ 371 (c)(1),
(2), (4) Date: May 10, 2011

(87) PCT Pub. No.: WO2010/028879
PCT Pub. Date: Mar. 18, 2010

(65) Prior Publication Data
US 2011/0259109 A1    Oct. 27, 2011

(30) Foreign Application Priority Data
Sep. 10, 2008  (DE) .......................... 10 2008 041 942

(51) Int. Cl.
*G01L 7/00* (2006.01)
*H01L 29/84* (2006.01)

(52) U.S. Cl.
USPC ............................................. 73/715; 257/415

(58) Field of Classification Search
None
See application file for complete search history.

(56) References Cited

U.S. PATENT DOCUMENTS

| | | | |
|---|---|---|---|
| 7,270,011 B2* | 9/2007 | Vossenberg | 73/754 |
| 2005/0142687 A1* | 6/2005 | Benzel et al. | 438/53 |
| 2011/0072906 A1* | 3/2011 | Ahles et al. | 73/727 |
| 2011/0169107 A1* | 7/2011 | Kramer et al. | 257/415 |
| 2012/0073379 A1* | 3/2012 | Ahles et al. | 73/715 |

FOREIGN PATENT DOCUMENTS

| | | |
|---|---|---|
| DE | 91 05 851 | 7/1991 |
| DE | 100 32 579 | 1/2002 |
| DE | 102 26 034 | 12/2003 |
| DE | 10 2004 036 032 | 7/2005 |
| DE | 10 2004 036 035 | 7/2005 |
| DE | 10 2004 006 201 | 8/2005 |
| DE | 10 2004 021 041 | 11/2005 |
| WO | WO 02/02458 | 1/2002 |

* cited by examiner

Primary Examiner — Andre Allen
(74) Attorney, Agent, or Firm — Kenyon & Kenyon LLP

(57) ABSTRACT

A sensor system, e.g., a pressure sensor system, includes a substrate having at least one trench on a first side. The trench is provided for forming a first diaphragm region on a second side opposite from the first side. In addition, a second diaphragm region and a cavern are integrated into the material of the first diaphragm region.

15 Claims, 2 Drawing Sheets

SENSOR SYSTEM, METHOD FOR OPERATING A SENSOR SYSTEM, AND METHOD FOR MANUFACTURING A SENSOR SYSTEM

BACKGROUND OF THE INVENTION

1. Field of the Invention

The present invention relates to a pressure sensor system.

2. Description of Related Art

Such sensor systems are generally known. For example, a sensor and a method for manufacturing a sensor are known from the published German patent application document DE 102 26 034 A1, the sensor including a semiconductor material having a first thickness, and having a second thickness in a diaphragm region, the second thickness being smaller than the first thickness. The sensor includes an open cavern in the diaphragm region due to the second thickness. The diaphragm region is deformable perpendicularly to the substrate as a function of the pressure in the open cavern, means being provided for measuring the deformation of the diaphragm region in the transition region between the first and the second thickness. One disadvantage of this sensor is that the diaphragm region may be used only for determining a relative pressure difference between the pressure in the open cavern and the pressure on the other side of the diaphragm region, i.e., the side facing away from the open cavern, while for determining an absolute pressure in the open cavern, hermetically sealed capping must be provided on the other side of the diaphragm region. The manufacture and installation of the capping is comparatively complicated and costly due to the requirements for seal-tightness of the capping.

BRIEF SUMMARY OF THE INVENTION

The sensor system according to the present invention, the method according to the present invention for operating a sensor system, and the method according to the present invention for manufacturing a sensor system have the advantage over the related art that an absolute pressure may be measured in a comparatively simple and cost-effective manner, the absolute pressure to be measured including in particular a comparatively high pressure. In addition, as the result of integrating the second diaphragm region and the cavern into the first diaphragm region, a comparatively compact sensor system is possible, and capping of the sensor may be dispensed with completely, so that the manufacturing costs may be reduced and system integration is greatly simplified; for the integration of the sensor system into a vehicle, compactness and ease of integration are of great technical and economic interest due to the limited available installation space in the vehicle. This is achieved by integrating the second diaphragm region and the cavern into the material of the first diaphragm region, so that the first diaphragm region carries out a relative pressure measurement, preferably between a first pressure on the first side and a second pressure on the second side of the substrate or in a trench on the second side due to a deformation perpendicular to the main plane of extension, while an absolute pressure measurement between the second pressure and a third pressure, i.e., a reference pressure, in the cavern is possible due to the integration of the second diaphragm region and the cavern into the first diaphragm region. The cavern preferably extends essentially parallel to the main plane of extension. In addition, the cavern in particular is enclosed completely, i.e., in all spatial directions, by the first diaphragm region, so that no additional substrate surface area besides the first diaphragm region is necessary for carrying out the absolute pressure measurement.

According to one preferred refinement, it is provided that the second diaphragm region together with the cavern includes an absolute pressure sensor, and the first diaphragm region together with the trench includes a differential pressure sensor, so that an absolute pressure measurement of a comparatively high first pressure is possible in a particularly advantageous manner with the aid of the differential pressure sensor without the need for significantly enlarging the required substrate surface area, since the second pressure is determined by the measurement by the absolute pressure sensor.

According to another preferred refinement, it is provided that the trench is provided extending from the first side to the first diaphragm region, essentially perpendicularly to the main plane of extension. Thus, a first pressure to be measured is guided by the trench from the first side of the substrate to the first diaphragm region in a particularly advantageous manner. It is thus preferably possible to achieve a comparatively high aspect ratio in the transition from the trench to the first diaphragm region. A further advantage is that the medium having the first pressure to be measured does not come into contact with measuring electronics and/or measuring means on the second side of the substrate, so that it is also possible to measure the pressure of corrosive or caustic media.

According to another preferred refinement, it is provided that a glass base is situated on the first side, the glass base preferably having a channel which is connected to the at least one trench, so that in a particularly advantageous manner the glass base functions as a connecting, fastening, sealing, and/or stabilizing element for connecting the trench to a pressurized chamber.

According to another preferred refinement, it is provided that the first diaphragm region has a reinforcing element which preferably extends from the first diaphragm region, perpendicularly to the main plane of extension, toward the first side, and which is particularly preferably situated parallel to the main plane of extension, essentially in the middle of the first diaphragm region, i.e., in the trench. A middle region of the first diaphragm region is reinforced in a particularly advantageous manner by the reinforcing element in such a way that the first diaphragm region is preferably deflected outside the reinforcing element, and therefore a deflection of the first diaphragm region does not cause deformation of the second diaphragm region. This has the advantage that the absolute pressure measurement is not influenced by the relative pressure measurement, thus ensuring comparatively high measuring accuracy.

According to another preferred refinement, it is provided that measuring elements and/or an evaluation circuit are situated in the region of the second side, measuring elements in the form of piezoresistive elements being situated in particular in the region of the first and/or the second diaphragm region, so that measurement and evaluation of the deflections of the first and the second diaphragm region may be carried out directly on the substrate in a particularly advantageous manner, using comparatively simple means.

A further subject matter of the present invention is a method for operating a sensor system, a first pressure in the trench relative to a second pressure on the second side being measured as a function of a first deformation of the first diaphragm region, and the second pressure relative to a third pressure in the cavern being measured as a function of a second deformation of the second diaphragm region, so that the absolute pressure of the first pressure may be measured using a comparatively compact and economically manufactured sensor system.

According to one preferred refinement, it is provided that the first deformation is measured with the aid of first piezoresistive elements, and the second deformation is measured with the aid of second piezoresistive elements, so that the first deformation preferably generates a first voltage signal, and the second deformation preferably generates a second voltage signal. Thus, the absolute first pressure may be determined in a particularly simple manner with comparatively little complexity of circuitry and wiring by determining the difference between the first voltage signal and the second voltage signal.

A further subject matter of the present invention is a method for manufacturing a sensor system, the substrate being provided in a first manufacturing step, the cavern being produced in a second manufacturing step, and the trench being produced in a third manufacturing step, thus allowing comparatively inexpensive manufacture of the sensor system in a particularly advantageous manner, using standard manufacturing processes of the semiconductor industry.

According to one preferred refinement, it is provided that in a fourth manufacturing step which in particular is carried out between the second and the third manufacturing steps, the measuring elements and/or the evaluation circuit are situated in the region of the second side, resulting in direct integration of the electrical and electronic components into the manufacturing process of the sensor system, so that additional contacting and/or implementing steps may be dispensed with.

According to another preferred refinement, it is provided that the second manufacturing step includes a first and a second substep, a porous layer being formed in the substrate in the first substep, and an etching process being used to produce a cavern beneath and/or in the porous layer in the second substep, the second manufacturing step preferably being carried out from the second side. Comparatively inexpensive manufacture of the cavern is thus possible in a particularly advantageous manner, in particular using the known advanced porous silicon membrane (APSM) technology known, for example, from published international patent application document WO 02/02458, published German patent application document DE 10 2004 036 032 A1, and published German patent application document DE 10 2004 036 035 A1.

According to another preferred refinement, it is provided that in the third manufacturing step the trench is produced in an etching process, in particular a trench process, from the second side, so that trenches having a comparatively high aspect ratio may be produced in a particularly advantageous manner.

DETAILED DESCRIPTION. OF THE INVENTION

Figure 1:
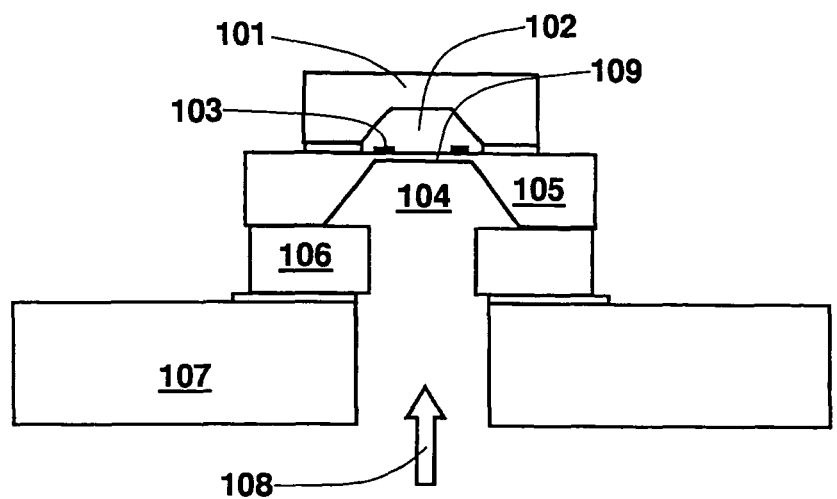
FIG. 1 shows a schematic side view of an absolute pressure sensor according to the related art.

FIG. 1 illustrates a schematic side view of an absolute pressure sensor according to the related art, having a sensor substrate 105, a sensor cavern 104, and a sensor diaphragm 109, the sensor substrate 105 being connected to a glass base 106, and the glass base 106 being glued to a printed circuit board 107 with the aid of an adhesive. Printed circuit board 107 and glass base 106 each have an opening, so that a pressure 108 reaches sensor cavern 104 from a lower side of printed circuit board 107, and sensor diaphragm 109 is deformed as a function of pressure 108 and as a function of a reference pressure 102. This deformation is measured by piezoelectric resistors 103 on the upper side of sensor diaphragm 109. The upper side of sensor diaphragm 109 has a hermetically sealed capping 101 which is used to set known reference pressure 102. By setting known reference pressure 102 on the back side of diaphragm 109, the absolute value of pressure 108 may be determined by measuring the relative difference between reference pressure 102 and pressure 108.

Figure 2:
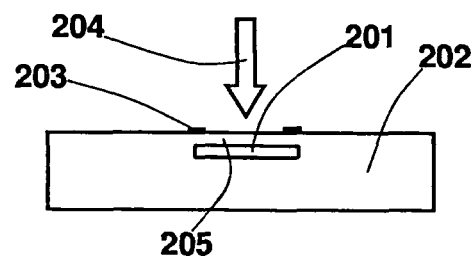
FIG. 2 shows a schematic side view of another absolute pressure sensor according to the related art.

FIG. 2 illustrates a schematic side view of a further absolute pressure sensor according to the related art, the further absolute pressure sensor having a substrate 202 and a cavern 201 in substrate 202. Cavern 201 is situated closer to the upper side of substrate 202, and is produced in particular using APSM technology. A diaphragm 205 is thus formed between cavern 201 and the upper side of substrate 202, and is deformed as a function of the relative pressure difference between a pressure on the upper side of diaphragm 205 and a reference pressure in cavern 201, this deformation being measured using piezoelectric resistors 203 on the upper side of substrate 202. Cavern 201 in particular has a vacuum.

Figure 3:
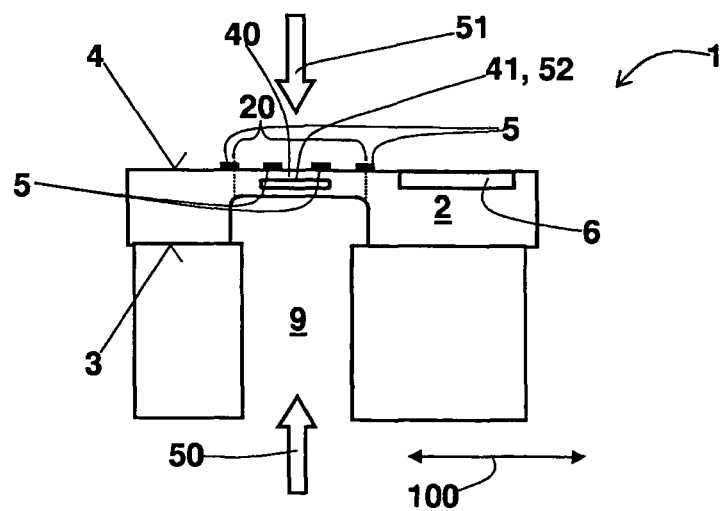
FIG. 3 shows a schematic side view of a sensor system according to a first specific embodiment of the present invention.

FIG. 3 illustrates a schematic side view of a sensor system 1 according to a first specific embodiment of the present invention, the sensor system having a substrate 2 having a main plane of extension 100, a first diaphragm region 20, and a cavern 41, first diaphragm region 20 completely enclosing cavern 41 in particular in a plane parallel to main plane of extension 100 and also in a plane perpendicular to main plane of extension 100. Cavern 41 is hermetically sealed, and has a third pressure 52, i.e., a known reference pressure. Third pressure 52 may also include a vacuum, for example. Substrate 2 also has a first side 3 which is essentially parallel to main plane of extension 100, and a second side 4, opposite from first side 3, which is parallel to main plane of extension 100, first diaphragm region 20 being essentially situated closer to second side 4, and substrate 2 having a trench 21 on first side 3, extending in a direction perpendicular to main plane of extension 100, from first side 3 to first diaphragm region 20, and preferably congruent or at least partially congruent with first diaphragm region 20, perpendicular to main plane of extension 100. First diaphragm region 20 has a second diaphragm region 40 which is situated between second side 4 and cavern 41, and which is oriented perpendicularly to main plane of extension 100, essentially congruent with cavern 41. On first side 3, substrate 2 is connected to a glass base 8 having a channel 9 which is connected to trench 21. A first pressure 50 to be measured reaches channel 9 and trench 21, and in trench 21 comes into contact with first diaphragm region 20. On second side 4 of substrate 2 a second pressure 51 acts on first diaphragm region 20, resulting in deformation or deflection of first diaphragm region 20 at least partially perpendicular to main plane of extension 100 as a function of the relative pressure difference between the first and the second pressure. This deflection of first diaphragm region 20 is measurable with the aid of measuring elements 5 on second side 4 of substrate 2. In particular, the deflection of first diaphragm region 20 with respect to remaining substrate 2 is measured on second side 4 with the aid of piezoelectric resistors in the transition region between first diaphragm region 20 and remaining substrate 2, a deformation of the piezoelectric resistors causing a change in the electrical resistance of the piezoelectric resistors, and in the relative pressure measurement between first and second pressures 50, 51 a first voltage signal is thus generated by first diaphragm region 20 as a function of the relative pressure difference between first and second pressures 50, 51. Second pressure 51 also acts on second diaphragm region 40, second diaphragm region 40 undergoing a deflection in cavern 41, perpendicular to main plane of extension 100, as a function of the relative pressure difference between second pressure 51 and reference pressure, i.e., third pressure, 52. This deflection is likewise measured by measuring elements 5' in the form of piezoelectric resistors, these measuring elements 5' being situated essentially in the edge region of second diaphragm region 40 on second side 4, and these piezoelectric resistors generating a second voltage signal as a function of second pressure 51. Since third pressure 52 is known and is essentially constant due to the hermetic seal of cavern 41, this measurement is an absolute pressure measurement. This absolute pressure measurement allows the second pressure to be determined, so that first pressure 50 is likewise to be determined in the relative measurement of first diaphragm region 20. For this purpose, the difference between the first and the second voltage signal is determined, particularly preferably by an integrated evaluation circuit 6 on second side 4. Trench 21 is produced using a trench process. Trench 21, cavern 41, first diaphragm region 20, and/or second diaphragm region 40 preferably has/have a round, circular, oval, polygonal, square, and/or annular design parallel to main plane of extension 100.

Figure 4:
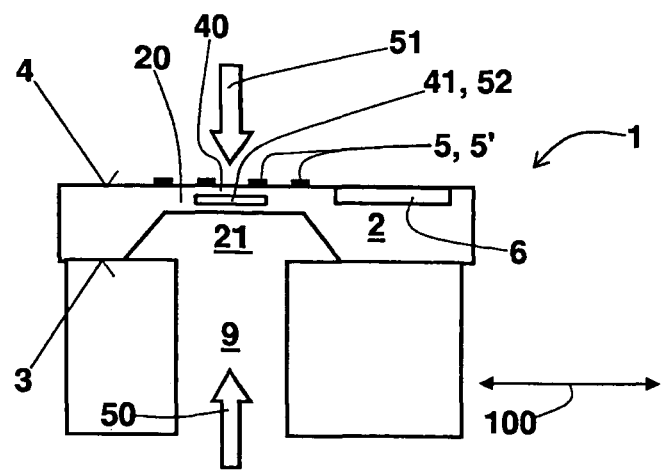
FIG. 4 shows a schematic side view of a sensor system according to a second specific embodiment of the present invention.

FIG. 4 illustrates a schematic side view of a sensor system 1 according to a second specific embodiment of the present invention, the second specific embodiment being essentially identical to the first specific embodiment illustrated in FIG. 3, trench 21 having a slightly different shape than in FIG. 3. Trench 21 according to sensor system 1 of the second specific embodiment is produced from first side 3 by anisotropic etching, using KOH or TMAH, for example.

Figure 5:
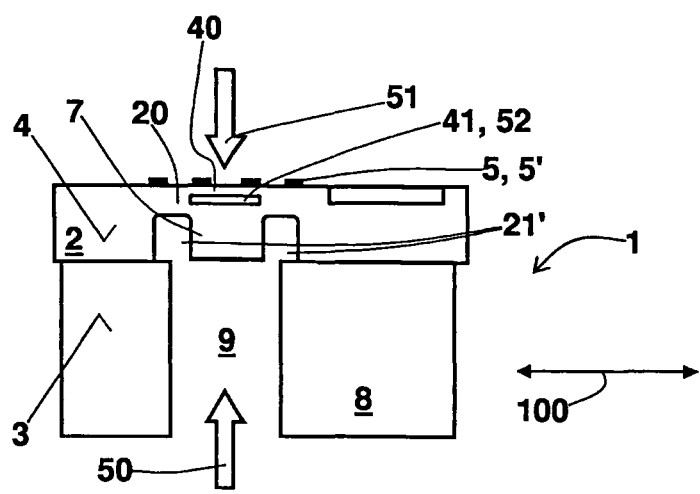
FIG. 5 shows a schematic side view of a sensor system according to a third specific embodiment of the present invention.

FIG. 5 illustrates a schematic side view of a sensor system 1 according to a third specific embodiment of the present invention, the third specific embodiment being essentially identical to the first specific embodiment illustrated in FIG. 3, first diaphragm region 20 having a reinforcing element 7 which extends from first diaphragm region 20, perpendicularly to main plane of extension 100, to first side 3, and which is situated essentially in the middle of first cavern region 20, parallel to main plane of extension 100. Thus, in FIG. 5 trench 21 is divided into two subtrenches 21', and is designed as an annular trench 21 circumferencing reinforcing element 7 in a circular manner parallel to main plane of extension 100. Thus, the first diaphragm region includes in particular a boss membrane.

Figure 6:
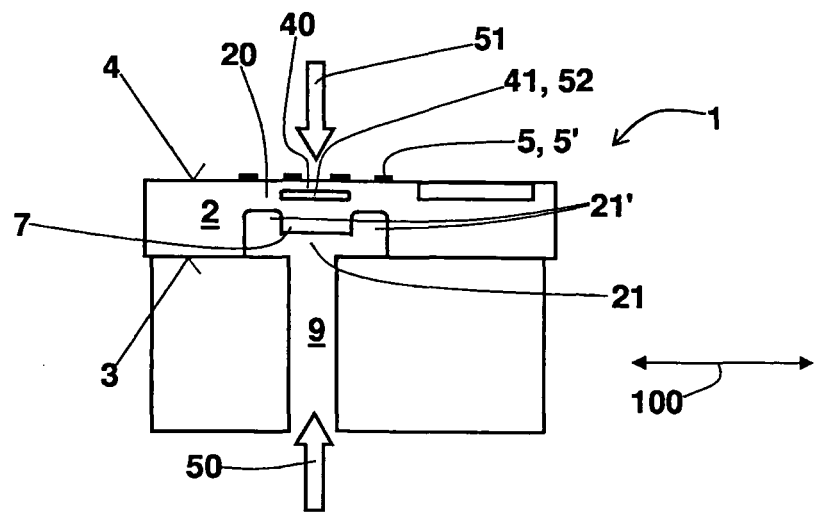
FIG. 6 shows a schematic side view of a sensor system according to a fourth specific embodiment of the present invention.

FIG. 6 illustrates a schematic side view of a sensor system 1 according to a fourth specific embodiment of the present invention, the fourth specific embodiment being essentially identical to the third specific embodiment illustrated in FIG. 5; reinforcing element 7 does not extend completely from first diaphragm region 20 to first side 3, but instead protrudes only partially into trench 21 in the direction of first side 3.

What is claimed is:

1. A pressure sensor system, comprising:
   a substrate having at least one trench on a first side of the substrate, the trench being configured to form a first diaphragm region on a second side of the substrate opposite the first side;
   wherein a second diaphragm region and a cavern are integrated within the first diaphragm region.

2. The sensor system as recited in claim 1, wherein the second diaphragm region and the cavern form an absolute pressure sensor, and wherein the first diaphragm region and the at least one trench form a differential pressure sensor.

3. The sensor system as recited in claim 2, wherein the first diaphragm region is configured such that deformation of the first diaphragm region generates a first voltage signal, and wherein the second diaphragm region is configured such that the deformation of the second diaphragm region generates a second voltage signal, the first voltage signal being generated as a function of a relative pressure difference between two pressures, and the second voltage signal being generated as a function of an absolute pressure.

4. The sensor system as recited in claim 3, further comprising:
   an evaluation circuit configured to generate a signal as a function of the difference between the first voltage signal and the second voltage signal.

5. The sensor system as recited in claim 3, further comprising:
   a reinforcing element attached to the middle of the first diaphragm region and extending in the middle of the at least one trench, wherein the reinforcing element has (i) a thickness extending perpendicular to the main plane of extension and toward the first side, and (ii) a lateral width extending parallel to the main plane of extension.

6. The sensor system as recited in claim 5, further comprising:
   a measuring element in the form of a piezoresistive element situated in the region of at least one of the first diaphragm region and the second diaphragm region.

7. The sensor system as recited in claim 1, wherein the cavern is completely enclosed by the first diaphragm region.

8. A method for operating a sensor system including a substrate having at least one trench on a first side of the substrate, the trench being configured to form a first diaphragm region on a second side of the substrate opposite the first side, wherein a second diaphragm region and a cavern are integrated within the first diaphragm region, the method comprising:
   measuring a first pressure in the at least one trench relative to a second pressure on the second side as a function of a first deformation of the first diaphragm region; and
   measuring the second pressure relative to a third pressure in the cavern as a function of a second deformation of the second diaphragm region.

9. The method as recited in claim 8, wherein the first deformation is measured with the aid of at least one first piezoresistive element generating a first voltage signal as a function of the first deformation, and wherein the second deformation is measured with the aid of at least one second piezoresistive element generating a second voltage signal as a function of the second deformation, and wherein the difference between the first voltage signal and the second voltage signal is determined.

10. The method as recited in claim 8, wherein the cavern is completely enclosed by the first diaphragm region.

11. A method for manufacturing a sensor system, comprising:
- providing, in a first step, a substrate, the substrate having a first side and a second side opposite one another;
- providing, in a second step, a cavern within the substrate near the second side; and
- providing, in a third step, at least one trench on the first side of the substrate, the trench being configured to form a first diaphragm region on the second side of the substrate;
- wherein a second diaphragm region and the cavern are integrated within the first diaphragm region.

12. The method as recited in claim 11, further comprising:
- providing, in a fourth step between the second step and the third step, at least one of a measuring element and an evaluation circuit situated in the region of the second side.

13. The method as recited in claim 12, wherein the second step includes a first substep and a second substep, a porous layer being formed in the substrate in the first substep, and an etching process being used to produce a cavern in the porous layer in the second substep, and wherein the second step is carried out from the second side.

14. The method as recited in claim 11, wherein in the third step the trench is produced using a trench etching process from the second side.

15. The method as recited in claim 11, wherein the cavern is completely enclosed by the first diaphragm region.

* * * * *

UNITED STATES PATENT AND TRADEMARK OFFICE
CERTIFICATE OF CORRECTION

PATENT NO.       : 8,485,041 B2                              Page 1 of 1
APPLICATION NO.  : 12/737966
DATED            : July 16, 2013
INVENTOR(S)      : Ahles et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 176 days.

Signed and Sealed this
Eighth Day of September, 2015

Michelle K. Lee
*Director of the United States Patent and Trademark Office*